United States Patent
Heuft et al.

(10) Patent No.: US 11,644,379 B2
(45) Date of Patent: May 9, 2023

(54) LEAK DETECTION

(71) Applicant: HEUFT SYSTEMTECHNIK GMBH, Burgbrohl (DE)

(72) Inventors: Bernhard Heuft, Burgbrohl (DE); Jurgen Kurz, Andernach (DE)

(73) Assignee: HEUFT SYSTEMTECHNIK GMBH, Burgbrohl (DE)

( * ) Notice: Subject to any disclaimer, the term of this patent is extended or adjusted under 35 U.S.C. 154(b) by 0 days.

(21) Appl. No.: 17/290,560

(22) PCT Filed: Nov. 29, 2019

(86) PCT No.: PCT/EP2019/083089
§ 371 (c)(1),
(2) Date: Apr. 30, 2021

(87) PCT Pub. No.: WO2020/109552
PCT Pub. Date: Jun. 4, 2020

(65) Prior Publication Data
US 2021/0404906 A1    Dec. 30, 2021

(30) Foreign Application Priority Data
Nov. 29, 2018   (DE) ..................... 10 2018 130 325.4

(51) Int. Cl.
*G01M 3/36* (2006.01)
*G01N 21/90* (2006.01)

(52) U.S. Cl.
CPC ............ *G01M 3/36* (2013.01); *G01N 21/909* (2013.01)

(58) Field of Classification Search
CPC ....... G01M 3/36; G01N 21/909; G01B 11/24; B60B 3/006
See application file for complete search history.

(56) References Cited

U.S. PATENT DOCUMENTS 3,921,366 A * 11/1975 Coop ..................... B65D 41/44
53/488
4,706,494 A    11/1987 Creed et al.
(Continued)

FOREIGN PATENT DOCUMENTS

DE    39 36 163 A1    5/1991
DE    102014216576 A1 *   2/2016    ............. B29C 49/42
(Continued)

OTHER PUBLICATIONS

Crown Cork & Seal Company, Improved Apparatus for Capping Bottles or Like Containers and Printing the Caps, 1937, p. 6, (GB 475205 A) (Year: 1936).*
(Continued)

*Primary Examiner* — David Z Huang
(74) *Attorney, Agent, or Firm* — Leydig, Voit & Mayer, Ltd.

(57) ABSTRACT

A device and a method for detecting leaks of closed containers with an inspection apparatus configured to determine the curvature of the container closure of the closed containers, as well as an evaluation apparatus by means of which the curvature of the closure is compared with a predefined value. A pressure generating apparatus is used to press each container closure flat prior to inspection. The pressure-generating apparatus comprises an actuator with which pressure is applied locally to each container closure from the outside.

9 Claims, 4 Drawing Sheets

(56) References Cited

U.S. PATENT DOCUMENTS

| | | | |
|---|---|---|---|
| 6,167,751 B1 | 1/2001 | Fraim et al. | |
| 9,200,993 B2* | 12/2015 | Chevalier, Jr | G01M 3/36 |
| 10,520,449 B2 | 12/2019 | Piana | |
| 2005/0067365 A1* | 3/2005 | Hanafusa | B65D 1/0246 |
| | | | 215/43 |
| 2006/0086065 A1* | 4/2006 | Tomalesky | B67C 7/0033 |
| | | | 53/425 |
| 2011/0016829 A1* | 1/2011 | Drenguis | B65B 55/08 |
| | | | 53/167 |
| 2018/0172603 A1* | 6/2018 | Piana | G01B 11/24 |

FOREIGN PATENT DOCUMENTS

| | | | |
|---|---|---|---|
| DE | 10 2015 211 317 A1 | 12/2016 | |
| EP | 0 892 918 A1 | 1/1999 | |
| EP | 892918 B1 | 5/2003 | |
| GB | 475205 A * | 11/1937 | B67B 3/006 |
| JP | 2006-044673 A | 2/2006 | |
| JP | 2017-003445 A | 1/2017 | |
| RU | 2484808 C2 | 6/2013 | |
| WO | 02/073151 A1 | 9/2002 | |

OTHER PUBLICATIONS

Gertlowski, Container Treatment Machine With an Inspection Device, 2016, p. 5, (DE-102014216576-A1) (Year: 2016).*
Search Report issued in related application DE 10 2018 130 325.4, dated Jul. 23, 2019, 8 pages.
Search Report issued in related application PCT/EP2019/083089, dated Mar. 4, 2020, with English language translation, 7 pages.
International Preliminary Report on Patentability issued in related application PCT/EP2019/083089, with English language translation, dated May 25, 2021, 15 pages.
Japanese Patent Office, Notice of Reasons for Refusal in Japanese Patent Application No. 2021-522995 (dated May 10, 2022).
Russian Patent Office, Search Report in Russian Patent Application No. 2021118670/28 (dated Feb. 22, 2022).

* cited by examiner (prior art)

LEAK DETECTION

CROSS-REFERENCE TO RELATED APPLICATIONS

This application is the U.S. national phase of the International Patent Application No. PCT/EP2019/083089 filed Nov. 29, 2019, which claims the benefit of German Patent Application No. 10 2018 130 325.4 filed Nov. 29, 2018, the entire content of which is incorporated herein by reference.

FIELD

The disclosure relates to a device and method for leak detection in closed containers with an inspection apparatus configured to determine the curvature of the container closure of the closed containers.

BACKGROUND

In the food, beverage and pharmaceutical industries, there are various methods for checking the tightness of closed containers. Typically used tinplate container closures can be made to vibrate, for example, by means of electro-magnetic or acoustic processes. The oscillation behavior of the closures can then be used to make a conclusion about the correct fit and tightness of the container closure.

With carbonated beverages, excess pressure also develops in correctly closed containers. This excess pressure causes elastic container closures, such as crown corks, to curve slightly outward. This characteristic curvature can be detected optically using 2D or 3D laser technology. If no curvature is detected, this may be due to a leak in the container.

Recently, carbonated beverages have increasingly been equipped with so-called pull ring closures. These pull ring closures are usually made of light metal such as aluminum and can be opened by the end user by hand without the aid of opening aids. Due to the fact that aluminum is non-magnetic and significantly softer than conventionally used materials for container closures, the acoustic and electro-magnetic leak testing methods discussed above cannot be used. The determination of the closure curvature is therefore currently the most promising method for checking the tightness of such containers.

One disadvantage of these aluminum closures is that once the curvature of the closure has formed, it does not revert on its own when the internal container pressure drops. This situation can occur in particular if a container closure has a fairly small leak or if the leak only occurred during the filling process. So if a curvature is detected in such aluminum closures, this does mean that a certain internal container pressure was present after the closure. However, it is not possible to determine with certainty whether sufficient internal container pressure was still present at the time of inspection.

SUMMARY

Disclosed embodiments are based on the task of providing a device and a method in which a leak test for light metal container closures can be carried out more reliably. A further task is to provide a device and a method in which a leak test can be carried out continuously, i.e. without interrupting the continuous transport of the containers in the production or filling process.

According to the disclosed embodiments, therefore, a device having the features according to claim 1 is proposed. The device for leak detection of closed containers comprises an inspection apparatus configured to determine the curvature of the container closure of the closed containers and an evaluation apparatus with which the curvature of the closure is compared with a predefined value. The device further comprises a pressure generating apparatus with which each container closure is pressed flat prior to inspection. The pressure-generating apparatus comprises an actuator with which pressure is applied locally to each container closure from the outside.

In correctly closed containers, the characteristic curvature will form again due to the internal container pressure after being pressed flat. In leaking containers, on the other hand, there is no increased or only a lower internal pressure, and therefore no or only a smaller curvature will form.

The device and the method of the disclosed embodiments are particularly suitable for leak detection of closed beverage containers. The beverage containers may be any commonly used beverage containers made of glass, plastic, PET or other suitable materials. These beverage containers usually have a substantially cylindrical shape and have a closable, circular mouth opening on their upper side.

The mouth opening of the beverage containers can thereby be provided in particular with a metallic closure. The disclosed embodiments are particularly suitable for leak detection in beverage containers in which the container closures are made of light metal such as aluminum or light metal alloys.

The curvature of the container closures is advantageously determined by means of an optical inspection apparatus. Suitable optical inspection apparatuses are point distance scanners or 2D/3D laser scanners.

It is thereby not necessary to exactly determine the complete course of the curvature of the container closure. A point distance scanner, for example, only determines the highest and the lowest point of the top of a closure. Due to the symmetry of container closures, the highest point of an intact closure is in the center of the closure. The difference in height between the highest and lowest point on the top of the closure is then a measure of the level of internal container pressure.

Higher precision can be achieved with commercially available 2D or 3D laser scanners. Here, either a line profile through the center of a container closure is determined (2D laser scanner) or a complete height profile of a container closure is created (3D laser scanner). This data can then be used to determine the internal pressure of the container even more precisely.

According to an embodiment, the container closure is pressed flat by means of a pressure-generating apparatus prior to optical inspection. The term "pressed flat" means that the container closure is pressed on in such a way that it extends essentially parallel to the plane defined by the mouth opening of the container.

The pressure-generating apparatus is advantageously arranged immediately upstream of the inspection apparatus. The pressure-generating apparatus can be an apparatus that serves the sole purpose of pressing the container closures of the containers to be inspected flat. This can be achieved by any pressure generating apparatus comprising an actuator with which pressure is applied locally from the outside to each container closure. The actuator is configured so that it can be set against the top of a closure. For this purpose, purely mechanical pressure-generating apparatuses can be used, for example, but also mechanical pressure-generating apparatuses with hydraulic, pneumatic or fluid-mechanical elements. The actuator can also be, for example, a jet of a fluid that is directed at the container closures, thereby exerting pressure locally on each container closure from the outside. Suitable fluids for this can be, for example, air or water.

Pressure generating apparatuses according to the disclosed embodiments are such apparatuses which are suitable to generate on the top of a closure a positive pressure which compensates the internal pressure of the container, so that the container closure extends parallel to the plane defined by the mouth of the container.

Basically, it is not important that the container closure is pressed flat completely and that it extends exactly in the plane defined by the mouth opening of the container at the moment of pressing flat. To determine whether the internal pressure of the container is high enough to indicate a correctly closed container, it is sufficient to apply a significant pressure to the container closure. This pressure can correspond approximately to the expected internal container pressure. In many cases, however, it may also be sufficient if the pressure applied to the closure deviates by up to +/−30% or up to +/−50% from the expected internal container pressure.

In one embodiment, the pressure-generating apparatus may comprise, as an actuator, a plunger that is applied against the top of each container closure. The plunger preferably has a diameter that is equal to or larger than the outer diameter of the container in the area of the mouth opening. The size of the contact surface of the plunger thereby ensures that the container closure can be pressed in to a maximum extent such that the container closure extends completely flat, i.e. parallel to the plane defined by the mouth opening of the container.

In modern bottling plants in the beverage industry, the containers are transported at bottle speeds of up to several 10000 containers per hour. With the pressure generating apparatus according to the disclosed embodiments, the application of pressure can take place during a very short period of time. Therefore, pressure can be applied to the container closures during transport.

The pressure generating apparatus can also be integrated in another container treatment apparatus. Advantageously, the pressure-generating apparatus can be provided, for example, in container treatment apparatuses in which the containers to be examined are held at their mouth area. The holding device can be designed in such a way that it also serves to pressing the container closure flat.

A suitable container treatment apparatus in which containers are held clamped between their mouth area and a base area is, for example, a labeler. In labelers, containers are clamped between a so-called container tulip and a bottom area, whereby the side wall area is then essentially freely accessible so that it can be provided with a container label. The container tulips thereby form a hollow cylinder-shaped receptacle for the closure area of the containers. These container tulips can be modified in such a way that they not only securely receive the container, but also simultaneously apply pressure to the container closure, for example flat-pressing it against the mouth opening of the container. The pressure-generating apparatus can be designed, for example, as an insert in the container tulip that ensures that the container closure is pressed flat during labeling.

A method for leak detection of closed containers is also disclosed. According to an embodiment, a container closure is pressed flat by applying a pressure. In this case, the pressure-generating apparatus comprises an actuator with which pressure is applied locally to each container closure from the outside. The container is then fed to an inspection apparatus for inspection of the container closure, in which the curvature of the container closure is determined. The curvature of the container closure is then compared to a predefined value. If the curvature is less than a predefined threshold value, this is taken as an indication that the container or container closure is leaking. Such a container is then rejected from the filling process.

The method according to the disclosed embodiments is particularly suitable for leak detection of closed containers which are manufactured by means of container closures made of light metal or light metal alloys. In particular, the method is suitable for checking so-called pull-ring closures made of aluminum.

Due to their material properties, closures made of aluminum or aluminum alloys cannot be examined using electromagnetic or acoustic methods. Although the determination of closure curvature is generally applicable to aluminum closures, the elasticity of aluminum is very low, so that once the closures have been curved out, they do not automatically flatten out again against the container opening when the internal container pressure decreases. For this reason, a pronounced closure curvature is also present in containers which have relatively small leaks or which have become leaky only during the filling process after closure. Such containers would conventionally be considered intact. According to an embodiment, it is also possible to detect such leaking containers and to eliminate them from the filling process.

BRIEF DESCRIPTION OF THE DRAWINGS

Various embodiments are illustrated in the drawings, in which.

DETAILED DESCRIPTION

Figure 1:
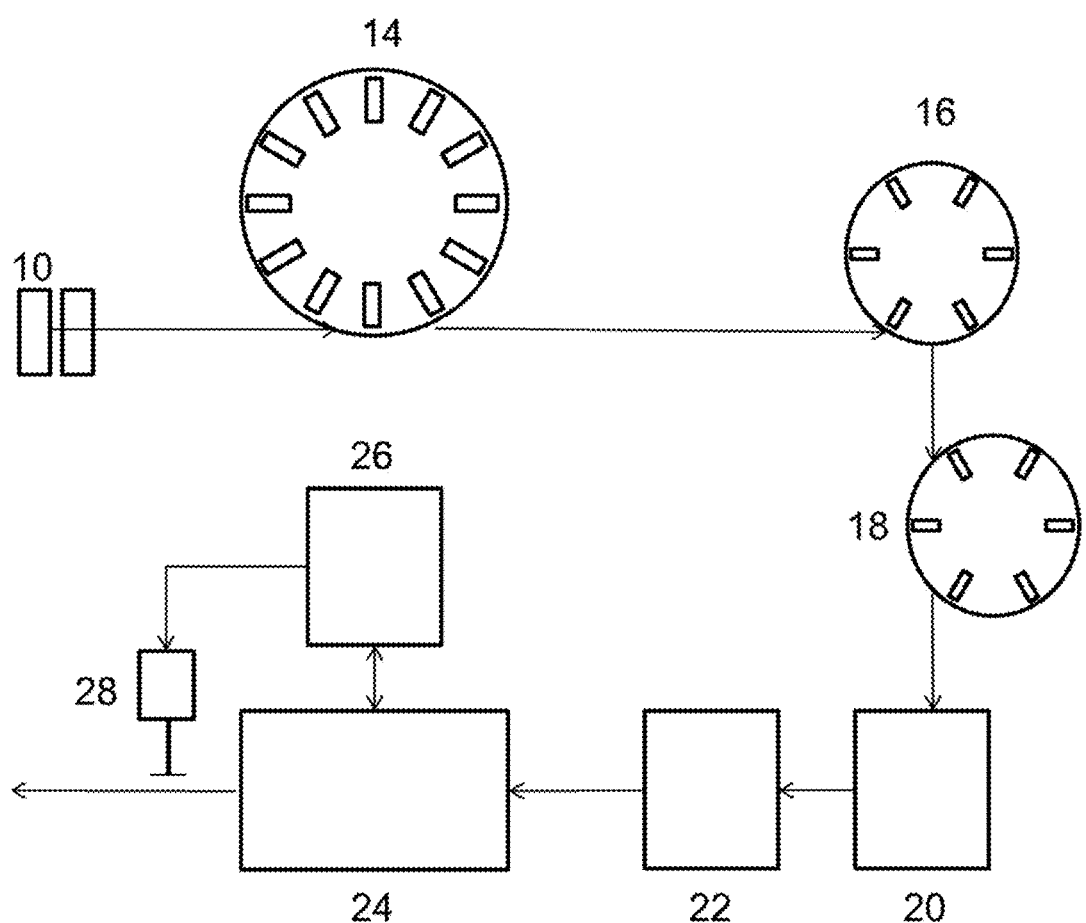
FIG. 1 is a schematic section of a filling line.

FIG. 1 schematically shows a section of a filling line in which containers 10 are filled with a carbonated product and then fitted with a pull ring closure 12. The cleaned, empty containers 10 are first transported to a filler 14. The containers 10 filled with the desired product are then closed in an air-tight manner in a capper 16 by means of a pull-ring closure 12. Finally, the containers 10 are labeled in a labeler 18 to identify the container contents.

Finally, the containers 10 are subjected to a comprehensive final inspection in which various properties of the filled, closed container 10 are examined in several inspection apparatuses 20, 22, 24. The results of the container inspection are evaluated in a control apparatus 26. Only those containers 10 that meet the required quality criteria are put into circulation. Containers 10 with a defect, on the other hand, are rejected from the filling process by a rejection apparatus 28 and disposed of.

One of the quality criteria carried out in the final inspection is testing the tightness of the containers 10. Depending on the container type and closure type, the skilled person is familiar with various methods for leak detection. The possibilities for leak detection are somewhat limited when using pull ring closures 12 made of aluminum. Since aluminum is non-magnetic and relatively soft, conventional leak detection methods that use acoustic or electro-magnetic excitation of the container closures cannot be used. Therefore, for leak detection in beverage containers 10 in which carbonated products are closed with pull ring closures 12, the curvature of the pull ring closures 12 is examined in the inspection apparatus 24. In the case of containers 10 closed in an airtight manner, an overpressure develops which causes curvature of the pull-ring closure 12.

Figure 2:
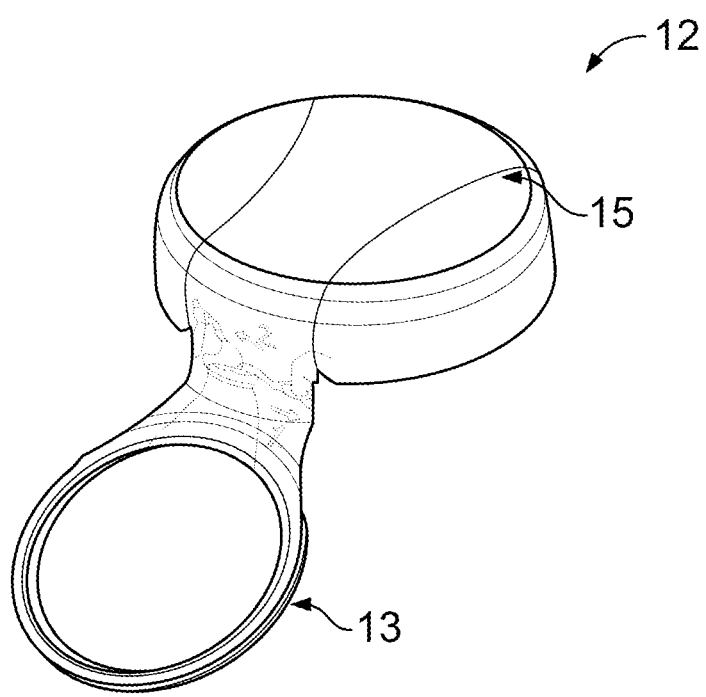
FIG. 2 is a pull-ring closure according to the state of the art.

A typically used prior art pull ring closure 12 is shown in FIG. 2. The pull ring closure 12 has a side tab or pull ring 13 that the user can pull on to open the closure. To facilitate opening, the pull ring closure 12 is made of aluminum. In addition, the pull ring closure 12 may also be provided with punch lines 15, further facilitating opening.

Figure 3:
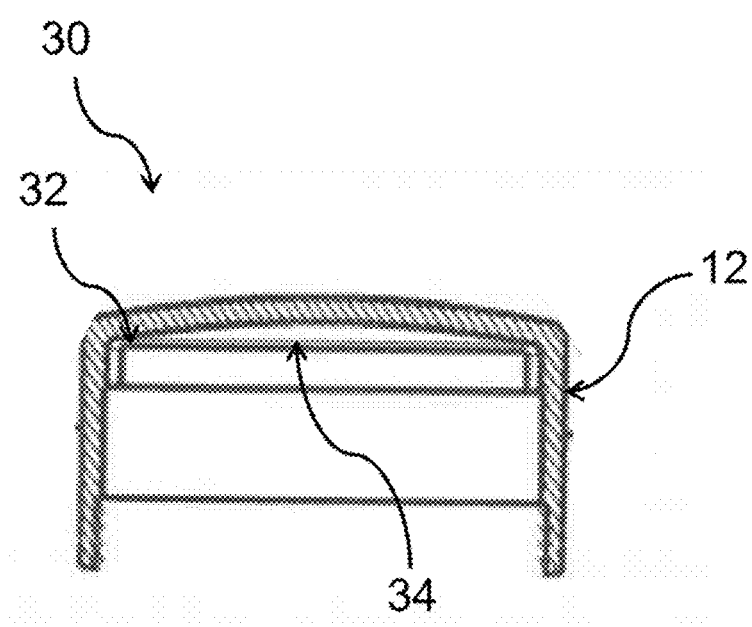
FIG. 3 is a container mouth closed with a pull-ring closure.

FIG. 3 shows a cross-section through a closed container head with pull-ring closure 12. In the mouth area 30 of the container 10, the pull ring closure 12 is in front contact with the container wall 32 over the entire circumference of the mouth and covers the entire container opening 34. However, due to the internal pressure of the container, the pull ring closure 12 does not extend in the plane defined by the container opening 34, but the pull ring closure 12 is pressed outward and is therefore slightly curved.

The soft material from which the pull ring closures 12 are made enables on the one hand the user to open the closures more easily. On the other hand, the lack of elasticity of the pull-ring closures 12 means that a curvature of a pull-ring closure 12 formed due to the internal pressure of the container does not return on its own when the internal pressure of the container decreases due to a small leak in the course of the filling process.

For this reason, a pressure is briefly applied to the pull ring closure 12 in the inspection apparatus 24 before leak detection, with which the pull ring closure 12 is pressed flat. In the filling line shown in FIG. 1, this pressure is applied in the labeler 18. In the labeler 18, the individual containers are each held clamped between their base and mouth areas so that the side wall of the containers is freely accessible and can be provided with the desired label. In the mouth area, the containers are thereby held in a container tulip 40.

Figures 4A, 4B:
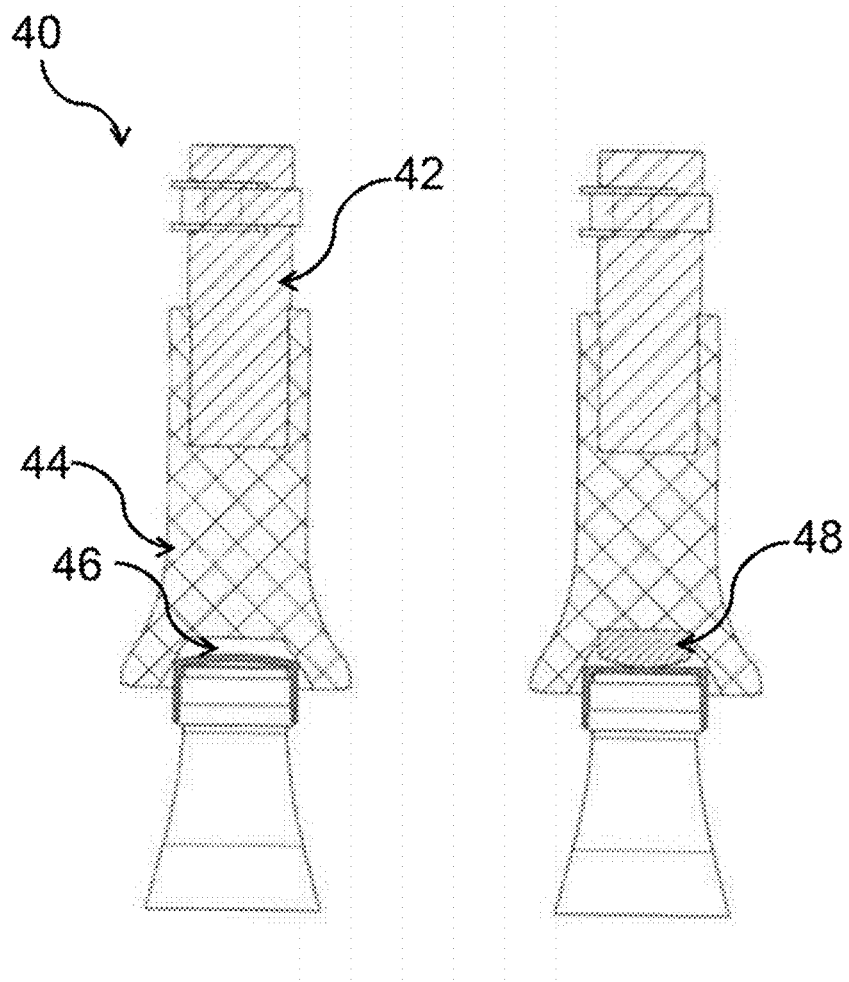
FIGS. 4*a*-4*b* are a container tulip of a labeler with and without modification.

FIG. 4a shows such a container tulip 40. It comprises a base 42 and a container adapter 44 on the underside of which a hollow-cylinder-shaped receptacle 46 is provided for the mouth area of the container 10. As can be seen in FIG. 4a, the container tulip 40 contacts only the frontal container wall in the mouth area of the container. The pull ring closure 12 therefore retains its curvature.

FIG. 4b illustrates a modified container tulip 40, the modification being that an insert 48 is provided which is mounted in the hollow cylinder-shaped receptacle 46. Now, when a container 10 is received and clamped in the modified container tulip 40, the insert 48 ensures that pressure is also applied to the curved pull ring closure 12 so that it is pressed flat while the container is received in the modified container tulip 40.

After the labeler 18, the containers are conveyed to the multiple inspection apparatuses 20, 22 and, in particular, to the optical inspection apparatus for checking the curvature of the container.

In the case of containers 10 which have a leak, the differential pressure between the interior of the container and the environment is non-existent or reduced, so that the pull-ring closure 12, which is pressed flat in the labeler 18, subsequently no longer curves out at all or only very slightly. This lack of curvature or insufficient curvature is then detected in the optical inspection apparatus 24, and the container 10 can then be rejected from the filling process.

If, on the other hand, the container 10 is closed in an airtight manner, the sufficiently high internal container pressure ensures that the pull-ring closure 12, which has been pressed flat, returns to its previous curvature after leaving the labeler 18. A container 10 having a pull ring closure 12 with a sufficient curvature is classified as airtight and can be released for sale.

LIST OF REFERENCE NUMBERS 10 container
12 pull-ring closure
13 pull-ring
14 filler
15 punch line
16 capper
18 labeler
20 inspection apparatus
22 inspection apparatus
24 optical inspection apparatus
26 control apparatus
28 rejection apparatus
30 mouth area
32 container wall
34 container opening
40 container tulip
42 base
44 container adapter
46 hollow cylinder-shaped receptacle
48 insert

The invention claimed is:

1. A device for leak detection of closed containers having light metal container closures and containing a fluid that exerts pressure on the closed container closures when sealed, the device comprising:
  an inspection apparatus configured to determine the curvature of the closed container closure of the closed containers,
  a pressure generating apparatus for pressing each closed container closure flat prior to inspection, and
  an evaluation apparatus with which the curvature of the closed container closure is compared with a predefined value,
  wherein the pressure generating apparatus comprises an actuator with which a pressure is applied locally from the outside to each closed container closure.

2. The device for leak detection according to claim 1, wherein the inspection apparatus for determining the curvature of the closed container closure is an optical inspection apparatus.

3. The device for leak detection according to claim 2, wherein the optical inspection apparatus for determining the curvature of the closed container closure is a point distance scanner or a 2D or 3D laser scanner, and wherein the distance between the highest point of the closed container closure and an edge point of the closed container closure is determined for determining the curvature of the closed container closure.

4. The device for leak detection according to claim 1, wherein the pressure generating apparatus is arranged upstream of the inspection apparatus.

5. The device for leak detection according to claim 1, wherein the pressure generating apparatus comprises a plunger with which the pressure is applied to each closed container closure.

6. The device for leak detection according to claim 1, wherein at least one further closed container treatment apparatus is arranged upstream of the inspection apparatus, and wherein the pressure generating apparatus is integrated in this further closed container treatment apparatus.

7. The device for leak detection according to claim 1, wherein a labeler with a container tulip is provided upstream of the inspection apparatus, and wherein the pressure generating apparatus is designed as an insert in the container tulip.

8. A method for detecting leaks of closed containers having light metal container closures and containing a fluid that exerts pressure on the container closures when sealed, the method comprising the steps of:
  applying pressure by means of a pressure generating apparatus to the closed container closures to press said closed container closures flat,
  inspecting the closed container closures to determine the curvature of the closed container closures of the closed containers; and
  comparing the determined curvature of the closed container closures with a predefined value,
  wherein the pressure generating apparatus comprises an actuator for locally applying pressure to each closed container closure from the outside.

9. The method according to claim 8 for leak detection of closed containers, wherein the closed container closures are aluminum pull ring closures.

\* \* \* \* \*